April 1, 1930. S. M. KASS 1,752,562
SAFETY STAND FOR USE WITH GAS STOVES
Filed May 23, 1928
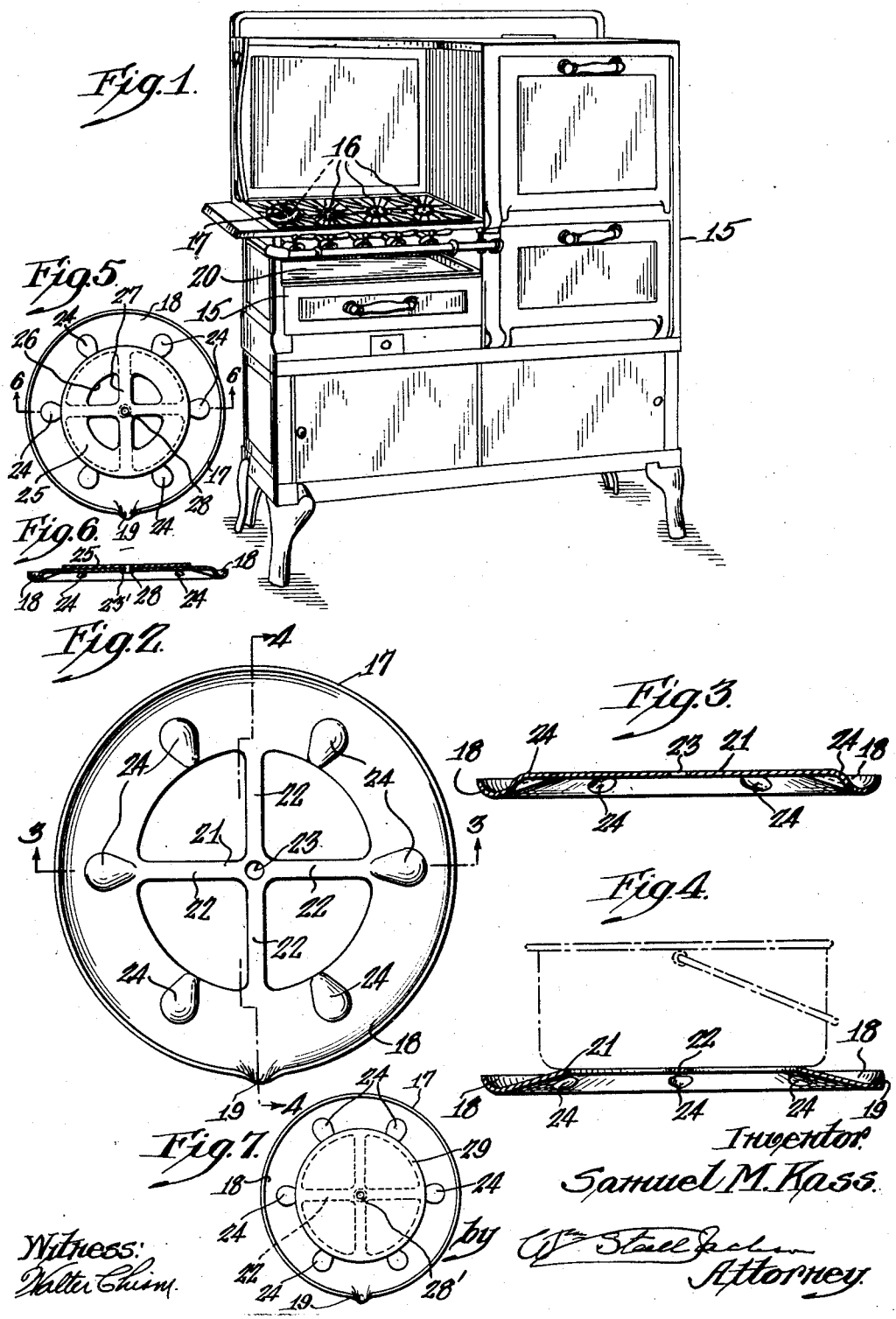
Inventor
Samuel M. Kass Patented Apr. 1, 1930

1,752,562

UNITED STATES PATENT OFFICE

SAMUEL M. KASS, OF PHILADELPHIA, PENNSYLVANIA

SAFETY STAND FOR USE WITH GAS STOVES

Application filed May 23, 1928. Serial No. 279,914.

My invention relates to a safety pot-support for use under pots above gas burners.

A purpose of my invention is to provide a pot support for use above gas burners that will eliminate any danger of the extinguishment of a gas flame of a burner by the overflowing contents of a pot above the burner, due to the pot boiling over. I shield the burner from any flood of liquid down the outside of a pot above the burner, an overflow that has in the past frequently struck the burner and often extinguished the flame, and partially or wholly stopped up the gas holes of the burner by flood residue from the vaporized overflow.

A further purpose is to support a pot over a gas flame upon a hollow upwardly converging truncated cone having a catch gutter around its base and a supporting top smaller than the bottom of the pot. I preferably provide the catch gutter with a spout for running off any caught liquid out of the gutter at one specific point of the gutter circumference, as into the pan that is normally beneath a burner.

A further purpose is to increase the effective supporting area of the top of a truncated cone support for a pot by upwardly pressing indentations at circumferential intervals around the upper rim of the cone.

A further purpose is to provide a hollow upwardly converging truncated cone stand having an overflow catch gutter around its base and for use above a burner with one or more plates each adapted to fit across the top of the cone to accommodate the kind and size of supporting seat presented by the stand to the kind and size of pot or other utensil to be supported above the burner. I preferably provide two interchangeable plates each adapted to make a loose pin connection with the cone member at the cone axis, one of the plates being open at spaced intervals around a central portion carrying the pin and the other desirably comprising a flat disc.

Further purposes will appear in the specification and in the claims.

I have elected to show one form only of my invention selecting a form that is efficient and practical in operation and which well illustrates the principles involved.

Figure 1 is a perspective view illustrating my invention is position upon a gas range.

Figure 2 is an enlarged top plan view of structure embodying my invention.

Figure 3 is a section taken upon the line 3—3 of Figure 2 in the direction of the arrows.

Figure 4 is a section taken upon the line 4—4 of Figure 2 in the direction of the arrows.

Figure 5 is a top plan view showing my invention with one form of auxiliary plate for use with small size pots.

Figure 6 is a section taken upon the line 6—6 of Figure 5.

Figure 7 is a top plan similar to Figure 5, but showing a different form of plate.

Like numerals refer to like parts in all figures.

Describing in illustration and not in limitation and referring to the drawings:—

Prior to my present invention it has often happened that a gas flame under a pot has been extinguished when the pot has inadvertently boiled over, a rush of liquid down the outside of a pot striking the burner and putting out the flame. When this has happened with no one at hand there has been an escape of gas into the room that has at times endangered life and property, and my invention is designed to correct this evil and danger.

I shield the burner and gas flame from any overflowing rush of liquid by means of an upwardly converging hollow stand that surrounds the burner.

The upper end of the shielding stand loosely seals circumferentially against the bottom of the pot and diverts any boiling-over liquid down the stand to a catch gutter, the stand supporting the pot and its seal with the bottom of the pot being a sufficiently loose one to let pass outwardly a considerable portion of the hot products of combustion.

In Figure 1 the gas range 15 having usual burners 16 is shown with one of my safety stands 17 over one of the burners in position to receive a pot.

The gutter 18 may have a delivery spout 19 to permit easy escape of any liquid caught in the gutter, or may be left as a tight receptacle.

In the one case the boiling over liquid runs down the outside of the cone into the gutter and thence without engaging the burner runs out the spout 19 into the drip pan 20 that is normally present beneath the burners of a gas stove and in the other case the liquid is retained in the gutter receptacle until removed, which is usually done by lifting the stand away and washing out the gutter at a sink.

The top 21 of the cone which receives the pot is preferably of internal diameter smaller than that of the bottom of the pot with which it is to be used.

I provide the top of the stand with a cross connecting portion 22 which prevents a supported pot or pan from tilting if laterally displaced from the middle of the cone and also strengthens and stiffens the cone. The connecting portion is preferably perforated at 23 at the cone axis.

Desirably the stand is stamped as an integral member from sheet metal and when this is done the central perforation 23 is stamped downwardly so as to leave a stiffening rim 23' around its under side.

I also find it desirable to provide the upper portion of the cone with upwardly directed indentations 24 at spaced intervals around the cone. The upper surfaces of these indentations are even with the cross strips and the upper rim of the cone and thus effectively increase the supporting area of the stand.

For better adaptation to properly seat very small pots and other utensils I preferably provide one or more auxiliary plates each adapted to removably seat across the top of the cone while making a loose pin connection in the perforation 23.

Desirably there are two of these plates, alike except that one, 25, Figures 5 and 6, has open spaces 26 intermediate radial arms 27 that support a central pin 28 received by the perforation 23 of the cone member, and the other 29 may comprise merely a flat disk having a suitable central pin 28' to be received in the perforation 23.

The need for these auxiliary plates is due to the wide variations in the sizes of pots requiring a support above a burner, and either form of auxiliary plate is the more desirable under different circumstances.

In operation the stand is set above the gas burner and a pot containing the liquid to be boiled is placed upon the stand. In the event that the pot boils over the liquid runs down the outside of the pot and is caught in the gutter instead of flooding the burner and perhaps putting out the gas flame.

For very small pots I may use the plate 25 or the plate 29 upon the top of the main stand, the plate being held central by the pin connection at the perforation 23. In this event the pot rests upon the top of the auxiliary plate and the operation is as already described.

The liquid caught in the gutter runs away at the spout into the usual pan beneath the burner.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:—

1. A safety device for supporting a pot above a gas burner, shielding the burner from any liquid boiling over from the pot, comprising an upwardly converging hollow truncated cone having a catch gutter around its base, upward indentations at circumferential intervals around the top of the cone adapted to engage the bottom of a pot supported upon the device and supporting strips across the cone at the middle with openings between the strips.

2. A safety device for supporting a pot above a gas burner and shielding the burner from any liquid boiling over from the pot, comprising an upwardly converging hollow truncated cone having a catch gutter around its base and a transverse strip across its top perforated at the center axis of the cone in combination with an auxiliary plate adapted to rest across the top of the cone member and having a downwardly extending pin fitting the perforation.

3. A safety device for supporting a pot above a gas burner and shielding the burner from any liquid boiling over from the pot, comprising an upwardly converging hollow truncated cone having a catch gutter around its base and a transverse strip across its top, in combination with a plate adapted to fit across the top and having a downwardly extending pin connection with the strip at the axis of the cone member and having openings at spaced intervals around and radially spaced from the pin.

SAMUEL M. KASS.